March 13, 1934.  R. M. BURT  1,951,271
ELECTRIC FUSE HOLDER
Filed April 22, 1933
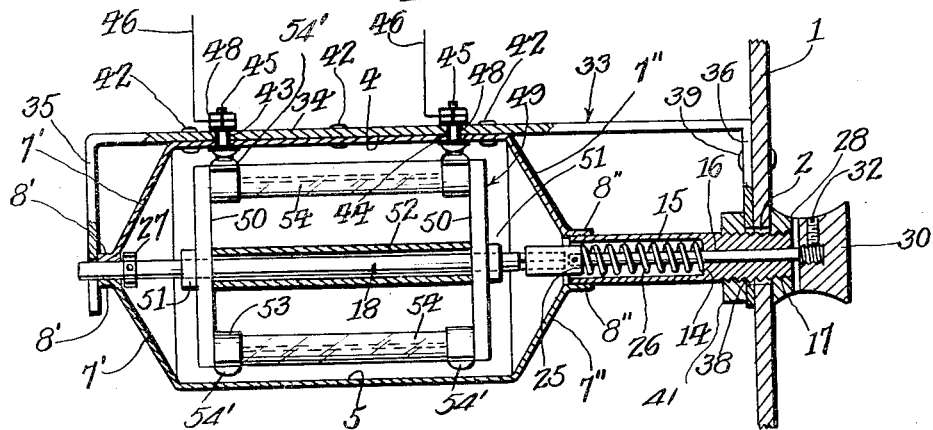
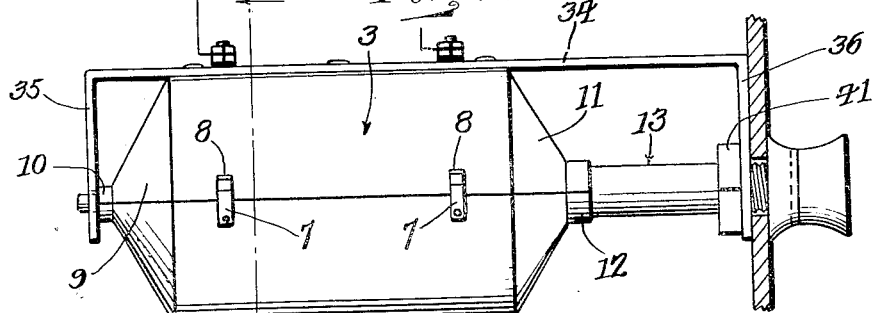
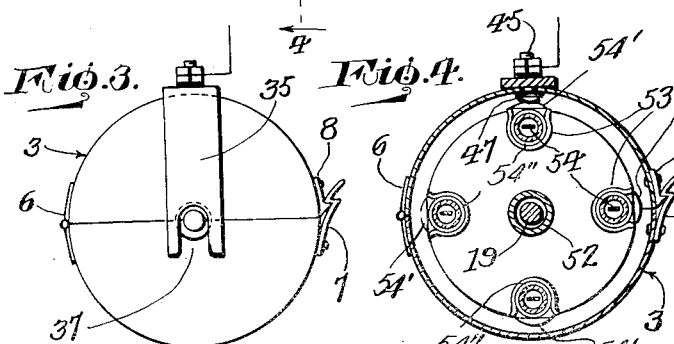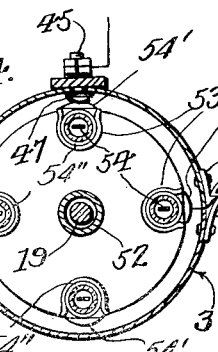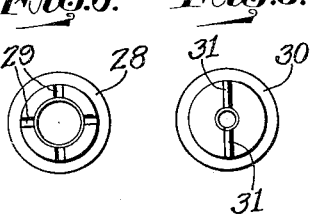
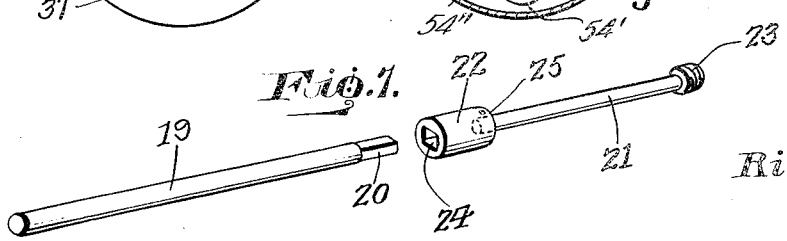
Inventor
Richard M. Burt
By Geo. P. Kimmel
Attorney Patented Mar. 13, 1934

1,951,271

UNITED STATES PATENT OFFICE 1,951,271

ELECTRIC FUSE HOLDER

Richard M. Burt, Wilkes-Barre, Pa.

Application April 22, 1933, Serial No. 667,458

5 Claims. (Cl. 200—125)

This invention relates to an electric fuse holder of the magazine type designed primarily for use in connection with automotive vehicles, but it is to be understood that a fuse holder, in accordance with this invention may be employed in any connection for which it is found applicable, and the invention has for its object to provide, in a manner as hereinafter set forth, a holder of the class referred to for removably accommodating a series of fuses capable of being selectively and expeditiously shifted to active position with respect to the circuit in which it is to be associated, whereby if one burns out, a new one may be immediately brought into action without removing the burnt-out fuse until all of the fuses carried by the holder have been spent.

A further object of the invention is to provide, in a manner as hereinafter set forth, a fuse holder of the magazine type capable of being readily emptied and refilled when occasion requires.

A further object of the invention is to provide, in a manner as hereinafter set forth, a fuse holder of the magazine type capable of being conveniently secured to a part of an automotive vehicle and further capable of being conveniently opened and refilled when occasion requires without the necessity of detaching it from the vehicle.

Further objects of the invention are to provide, in a manner as hereinafter set forth, a fuse holder of the magazine type which is simple in its construction and arrangement, strong, durable, compact, readily assembled, including means for latching a fuse in selected position, conveniently operated for shifting a fuse to active position, expeditiously emptied and refilled, quickly installed with respect to an automotive vehicle, and comparatively inexpensive to manufacture.

To the above ends essentially and to others which may hereinafter appear, the invention consists of such parts and such combination of parts which fall within the scope of the invention as claimed.

In the drawing:

Figure 1 is a longitudinal sectional view of the holder as installed with respect to the dashboard of an automotive vehicle.

Figure 2 is a side elevation of the holder when installed.

Figure 3 is a view looking towards the outer end of the holder.

Figure 4 is a section on line 4—4 Figure 2.

Figure 5 is a view looking towards the outer face of the lock nut.

Figure 6 is a view looking towards the inner face of the handle member.

Figure 7 is a perspective view of the operating shaft disassembled.

Referring to the drawing, 1 indicates a part of an automotive vehicle and is illustrated by way of example as a dashboard formed with an opening 2. The holder is adapted to be anchored to and to extend from the part 1.

The holder includes a horizontally disposed housing 3 of cylindrical cross section formed of a stationary upper section 4 and a shiftable lower section 5 hinged at the top of one side thereof to the bottom of one side of section 4, as at 6. The bottom of the other side of section 4 and top of the other side of section 5 are connected together by resilient latches 7 releasably engaging in keepers 8. Each section of the housing has its front end 7' tapered and formed centrally thereof with a semi-circular flange 8'. When the sections are latched together the front ends thereof coact to form the front end portion 9 of the housing of frusto-conoidal contour and to provide said end portion 9 centrally thereof with a bearing 10. The flanges 8' coact to form the bearing. Each section of the housing has its rear end 7'' tapered and formed centrally thereof with a semi-circular flange 8''. When the sections are latched together the rear ends thereof coact to form the rear end portion 11 of the housing of frusto-conoidal contour and to provide said end portion 11 centrally thereof with a collar 12. The flanges 8'' coact to form the collar 12. The latter is of greater diameter than bearing 10.

Arranged within the collar 12 is the forward end of a tubular combined carrying and bearing element 13 having its bore of two different diameters. The junction of the two diameters of the bore provides a shoulder 14. That part of the element 13 having the portion of greatest diameter of the bore is indicated at 15 and the part having the portion of smallest diameter of the bore is indicated at 16. The latter has its outer periphery provided with threads 17. The part 16 extends through and is of less diameter than opening 2. The part 15 extends into collar 12.

The holder includes a rotatable and adjustable operating shaft 18 formed of a front section 19 having a reduced squared extension 20 at its inner end, and a rear section 21 provided at its forward end with a socket forming member 22 and at its rear end with a peripherally threaded circular enlargement 23. The socket 24 provided by member 22 corresponds in contour to that of extension 20. The member 22 is of greater diameter than the remaining part of section 21 to form a shoulder 25. The sections 19 and 21 are coupled together for bodily moving in unison by the extension 20 coacting with the walls of socket 24. The section 19 is journaled in the bearing 10 and is of a length to extend into the rear end portion 11 of the housing 3. The member 22 of section 21 is arranged in the rear end portion 11 of housing 3 and extends into collar 12. The shaft section 21 passes through part 15 and is journaled in as well as extending rearwardly from part 16 of element 13. Carried by section 21 and interposed between shoulders 14 and 25 is a coiled controlling spring 26 which normally maintains the free end of extension 20 against the base of socket 24. To arrest the outward shift of section 19 relative to housing 3, there is detachably secured on section 19 a collar 27 which abuts the inner end of bearing 10 when the sections of the housing 3 are latched together and the shaft sections 19 and 21 held in abutting engagement by spring 26.

The element 13 is connected to the semi-circular flange 8" at the inner end portion 7" of housing section 4. The enlargement 23 on shaft section 21 is arranged rearwardly of part 16 of element 13. Threadedly engaging with part 16 of element 13 and abutting part 1 of the vehicle is a lock nut 28 having its rear or outer face formed with radially disposed equidistant notches 29 corresponding in number to that of the fuses arranged in the holder. Threadedly engaging with and extending rearwardly from the enlargement 23 is a handle member 30 having its inner or forward face provided with a pair of endwise spaced aligning ribs 31 diametrically thereof for seating in a pair of selective endwise opposing notches or grooves 29. The spring 26 normally tends to maintain the ribs 31 in the selected notches 29 for latching the operating shaft 18 in adjusted position and to prevent it from rotating relative to housing 3. A binding screw 32 is carried by the handle member 30 to prevent the latter from shifting about enlargement 23.

The holder includes an inverted yoke-shaped suspension member 33 for housing 3 consisting of a top stretch 34 and a pair of end stretches 35, 36 each integral with, of less length than and disposed at right angles to stretch 34. The stretches 35, 36 are arranged in parallel spaced relation. The free end portion of stretch 35 is formed with a furcation 37. The stretch 36 in proximity to its free end is provided with an opening 38 having its axis arranged above the transverse median of furcation 37. The stretch 36 abuts the forward face of part 1 of the vehicle and is anchored to such part by holdfast means 39. The opening 38 aligns with opening 2 and through which extends element 13. Mounted upon the latter is a clamping nut 41 which abuts the forward face of stretch 36. When shaft 18 is mounted in position, the forward end of shaft section 19 extends through the furcation 37. The stretch 34 is fixedly secured at spaced intervals to the housing section 4 by the spaced holdfast device 42. The stretch 34 is positioned on the outer face of housing section 4 and is formed with a pair of spaced openings 43 aligning with a pair of spaced openings 44 formed in the top of housing section 4. Extending through stretch 34 and the top of housing 3 and arranged in the aligning openings are binding posts 45 having coupled to the upper ends thereof the circuit connections 46. Carried by the posts 45 and arranged within housing 3 at the upper portion thereof are curved resilient combined contact and latching elements 47 which are insulated as at 48 from housing 3 and stretch 34. The elements 47 are in electrical contact with the posts 45.

Arranged within the housing 3 is a fuse carrier 49 of reel-like form consisting of a pair of spaced parallel oppositely disposed axially apertured discs 50 provided with hubs 51 and connected together at their axes by a tubular member 52. The opposed faces of the disc 50 have fixed thereto sets of resilient clamps 53 open at their outer ends. The number of clamps of each set corresponds to the number of fuses arranged in the holder. The clamps of each set are spaced equi-distant from each other. The clamps of one set align with the clamps of an adjacent set. The fuses are indicated at 54. Each fuse 54 has a pair of contacts 54' at its ends. Each contact 54' is carried by a ferrule 54" and is disposed outwardly with respect to the open end of a clamp 53 when the fuse is seated in a pair of opposed clamps. This arrangement provides clearances for the clamps with respect to the elements 47 when the carrier is revolved. A fuse 54 is secured at its ends by a pair of aligning clamps in interposed position between the discs 50. The open outer end of each clamp is of a width to permit an element 47 to extend therein and contact with an end of a fuse. The elements 47 not only provide for electrically connecting a fuse in circuit, but also function to assist in latching a fuse in selected position. The hubs 51 are fixed to shaft section 19 and bodily carried with and on the operation or adjustment of shaft 18. The shaft section 19 and carrier 49 are bodily removable from housing 3 whereby the burnt-out fuse may be removed and new fuses substituted.

When opening housing 3, section 5 thereof is released and it swings from housing section 4, after which the carrier 49 can be readily removed. The shaft 18 when the carrier is provided with four fuses is shifted one-quarter of a revolution to remove a burnt-out fuse from engagement by the contacts 47 and to position a new fuse to engage the contacts. The extent of shift imparted to the carrier will depend upon the number of fuses carried thereby.

What I claim is:—

1. An electric fuse holder comprising a rotatable operating shaft formed of a removable and a non-removable lengthwise shiftable section, said sections having coacting means to provide for the bodily rotating thereof in unison, a housing supporting said removable section, a combined carrying and bearing element attached to the housing for supporting said non-removable section, a controlling spring within said element for normally maintaining said sections in abutting relation, said housing including a stationary part and a shiftable normally closed latched hinged part for opening the housing when unlatched, a fuse carrier fixed to and bodily rotating with said removable section and bodily removable with the latter from the housing when said hinged part is unlatched, and a suspension element adapted to be anchored at one end to a support and anchored intermediate its ends to the stationary part of the housing.

2. An electric fuse holder comprising a housing formed of a stationary and a shiftable section, said sections having coacting means for detachably connecting them together to close the housing, a removable rotatable carrier of reel-like form within the housing and provided with spaced opposed resilient means arranged therein adjacent the ends thereof for detachably engaging the ends of a fuse for removably connecting the latter to the carrier, a pair of contact elements secured to the housing for electrical connection with the ends of the fuse, a shaft for rotating the carrier journaled at one end in one end of the housing, a rotatable spring controlled slidable means extending into the housing from the other end of the latter and releasably engaging in the other end of said shaft for rotating the latter and in connection with the housing removably suspending the shaft and carrier within the latter, and a stationary supporting means for said slidable means connected to and extended from the housing.

3. An electric fuse holder comprising a housing formed of a stationary and a shiftable section, said sections having coacting means for detachably connecting them together to close the housing, a removable rotatable carrier of reel-like form within the housing and provided with spaced opposed resilient means arranged therein adjacent the ends thereof for detachably engaging the ends of a fuse for removably connecting the latter to the carrier, a pair of contact elements secured to the housing for electrical connection with the ends of the fuse, a shaft for rotating the carrier journaled at one end in one end of the housing, a rotatable spring controlled slidable means extending into the housing from the other end of the latter and releasably engaging in the other end of said shaft for rotating the latter and in connection with the housing removably suspending the shaft and carrier within the latter, a stationary supporting means for said slidable means connected to and extended from the housing, and said slidable means and the supporting means for the latter having coacting parts for latching the slidable means from rotation.

4. An electric fuse holder comprising a housing formed of a stationary and a shiftable section, said sections having coacting means for detachably connecting them together to close the housing, a removable rotatable carrier of reel-like form within the housing and provided with spaced opposed resilient means arranged therein adjacent the ends thereof for detachably engaging the ends of a fuse for removably connecting the latter to the carrier, a pair of contact elements secured to the housing for electrical connection with the ends of the fuse, a shaft for rotating the carrier journaled at one end in one end of the housing, a rotatable spring controlled slidable means extending into the housing from the other end of the latter and releasably engaging in the other end of said shaft for rotating the latter and in connection with the housing removably suspending the shaft and carrier within the latter, a stationary supporting means for said slidable means connected to and extended from the housing, and a stationary suspension element secured to the housing and connected to said supporting means.

5. An electric fuse holder comprising a housing formed of a stationary and a shiftable section, said sections having coacting means for detachably connecting them together to close the housing, a removable rotatable carrier of reel-like form within the housing and provided with spaced opposed resilient means arranged therein adjacent the ends thereof for detachably engaging the ends of a fuse for removably connecting the latter to the carrier, a pair of contact elements secured to the housing for electrical connection with the ends of the fuse, a shaft for rotating the carrier journaled at one end in one end of the housing, a rotatable spring controlled slidable means extending into the housing from the other end of the latter and releasably engaging in the other end of said shaft for rotating the latter and in connection with the housing removably suspending the shaft and carrier within the latter, a stationary supporting means for said slidable means connected to and extended from the housing, said slidable means and the supporting means for the latter having coacting parts for latching the slidable means from rotation, and a stationary suspension element secured to the housing and connected to said supporting means.

RICHARD M. BURT.